March 21, 1967 W. W. CHAMBERS ET AL 3,310,713
TEMPERATURE CONTROL SYSTEM
Filed Jan. 13, 1964 2 Sheets-Sheet 1

INVENTORS.
WILLIAM W. CHAMBERS
WESLEY V. DeFOREST
BY
*Fowler, Knobbe + Lambrell*
ATTORNEYS.

March 21, 1967 W. W. CHAMBERS ET AL 3,310,713
TEMPERATURE CONTROL SYSTEM
Filed Jan. 13, 1964

INVENTORS.
WILLIAM W. CHAMBERS
WESLEY V. DeFOREST
BY
Fowler, Knobbe & Lambrell
ATTORNEYS.

United States Patent Office 3,310,713
Patented Mar. 21, 1967

3,310,713
TEMPERATURE CONTROL SYSTEM
William W. Chambers, Anaheim, and Wesley V. De Forest, Long Beach, Calif., assignors to Robertshaw Controls Company, Richmond, Va., a corporation of Delaware
Filed Jan. 13, 1964, Ser. No. 337,324
5 Claims. (Cl. 317—132)

The present invention relates to improved temperature control systems and in particular systems wherein the temperautre sensing device, such as a thermostatically actuated switch, is not required to conduct through its contacts the electrical power required to control a furnace or like heating or cooling source.

Many contemporary temperature control systems embody a temperature sensitive control (usually known as a thermostat) comprising an electrical switch in which a bimetallic element makes or breaks the load current to an electromagnetic actuator which controls the flow of fuel into a furnace or other heating or cooling source. In this type of system, the thermostatically actuated switch is required to carry the full electrical power required to actuate the heating or cooling means, thereby requiring a physically large switch assembly and one having a fast actuate and deactuate movement to avoid excessive burning of the contacts. A typical switch of this type is one employing a snap action bimetallic element. A serious disadvantage associated with this type of switch, however, is that it requires a fairly large temperature differential to either close or open the contacts from their respectively opposite state; a representative differential being 5° to 7° F. This large temperature differential is undesirable for home heating installations because of the resulting discomforture to the building occupants. This problem is somewhat diminished by employing "heat anticipation" produced, for example, by placing an electrical resistance element physically adjacent the bimetallic element and in series circuit with the load current so that the thermostatic switch opens sooner than otherwise. However, this does not provide a completely satisfactory solution to the problem since repeated closure of the contacts and resultant repeated heating of the heating element raises the temperature of the environment immediately adjacent to the thermostat, resulting in a lowering of temperature of the total environment, which decrease in temperature is known in the art as "droop."

A further disadvantage of temperature control systems which require the temperature sensing element to transfer the full load power is that contact resistances of several ohms may have a noticeable affect on operation. Accordingly, such systems are especially susceptible to the effects of time, temperature and atmosphere on the electrical contacts.

Temperature control systems constructed in accordance with the present invention overcome the foregoing enumerated disadvantages by providing temperature control systems in which the bimetallic thermostatic element need carry only a fraction of the current necessary to actuate the heating or cooling source with the corollary that the thermostatic element may be physically small in size and have relatively slow actuate and deactuate times because of the small currents which are switched through its contacts. Thus, the problem of pitting and burning of the contacts which result from opening and closing the contacts to large current values is eliminated. Also, since only minimal or no snap action is required, the heat differential can be small, no heat anticipation is required; hence, no droop is present.

Another feature of the present invention is that contact resistances of the order of hundreds of ohms have no noticeable effect on the operation of the temperature control system. Therefore, the effects of time and atmosphere on the contacts are greatly minimized.

An additional feature of the present invention is to substantially minimize the effect of current leakage in a semiconductor amplifying device. These leakage currents have discouraged the use of transistors in such systems since these currents tend to keep the relay actuated after the thermostatic contacts have opened, thus obviating safe and trouble-free operation. Further, the leakage current of a semiconductor element increases as the environmental temperature of the element increases. Heretofore, this phenomena has even further reduced the use of such elements since it is often desirable to install them in an environment subject to elevated ambient temperatures of the order of 120° F.

A significant feature of the present invention is that it substantially compensates for the effects of leakage currents of semiconductor amplifier devices so that trouble and maintenance-free temperature control systems may be provided even when a transistor employed to drive a relay coil or other actuator is subjected to elevated ambient temperatures.

Further, contemporary heating systems have most economically employed a step-down transformer and coupled half-wave rectifier for operating the electromagnetic relay or other actuators of the heating or cooling source. Hum and chatter effects in the relay normally associated with the use of half-wave rectified power are minimized by employing a slow release relay. A preferred relay of this type uses a lag coil comprising a copper member coaxial with the coil so that when the magnetic field collapses during one half of each A.C. cycle, the voltage generated in the lag coil produces a current therethrough for maintaining a magnetic flux in the magnetic armature until the succeeding A.C. half-cycle. The lag coil type relay, however, has certain attendant disadvantages, such as the additional expense of fabricating and mounting same and the space required therefor which could otherwise be used for making the coil smaller or for additional coil turns for providing a stronger magnetic field.

The present invention provides a temperature control system in which the lag coil can be deleted to avoid the disadvantages associated therewith while still employing half-wave rectified power. In a preferred embodiment of the present invention, a single diode both permits the lag coil to be eliminated and substantially reduces peaks generated by the periodic collapse of the magnetic field in the magnetic actuator. Such voltage spikes can be particularly deleterious when the system employs a semiconductor amplifying element. Further, this diode provides the additional function of bypassing any reverse currents on the reverse half of each A.C. cycle to further reduce the tendency of the magnetic actuator to hum or chatter.

Briefly, in accordance with a preferred form of the present invention, a temperature control system comprises a first series circuit including the emitter and collector electrodes of a transistor, the relay coil of the electromagnetic actuator and conductor leads connected to a source of alternating current. A diode is connected in parallel with the relay coil conducting in opposition to the current flowing through the transistor emitter and collector electrodes. A second series circuit includes a resistor and a thermostatically actuated switch, one end of this circuit being connected to the base electrode of the transistor and the other electrode connected to a node of the first series circuit so that the transistor is biased to a current conductive state on one half of each A.C. cycle when the switch is closed and is non-conductive for half of the A.C. cycle when the switch is open. During the reverse half cycle current flow will be small due to the transistor characteristics and because the reverse bias is low. The relay coil is driven by the current which flows through the transistor during its conductive periods. The parallel coupled diode provides the multiple functions of (1) substantially suppressing surge currents resulting from the voltage generated by the periodic collapse of the magnetic field of the relay coil, (2) provides a current flow through the coil during the non-conductive cycle of the transistor to maintain a magnetic flux in the relay member, thereby delaying its dropout until the succeeding half of the A.C. cycle, and (3) bypasses the reverse current on the reverse bias half of each A.C. cycle to further diminish the tendency of the relay coil to hum.

Additional features and circuit modifications described hereinafter permit the system to be used in elevated temperatures, diminish the sensitivity of the system to leakage currents across the thermostatically actuated switch, and permit the use of a low-voltage transistor from the typical step-down transformer.

A more thorough understanding of the invention may be obtained by a study of the following detailed description taken in connection with the accompanying drawings in which.

In the several figures of this specification, like numerals denote like elements.

Figure 1:
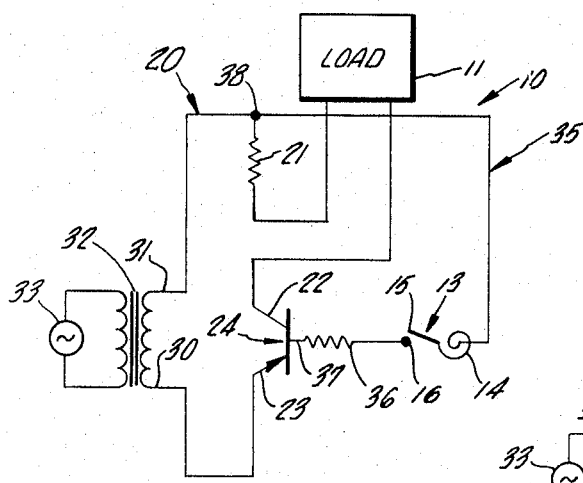
FIG. 1 is a circuit schematic illustrating a simplified temperature control system constructed in accordance with this invention.

Referring now to FIG. 1, the overall function of the temperature control system 10 is to provide current to load 11 when the thermostatically controlled actuator 13 is heated to a predetermined temperature. As shown, a typical actuator comprises a bimetallic member 14 controlling movement of movable switch contact 15 to make or break with fixed switch contact 16. The system is so designed that the thermostatically actuated switch 13 need carry only a very low current load so that it may be physically small in size and have a relatively slow actuation and deactuation time.

The complete system comprises a first series circuit 20 including a resistance 21, load 11, the collector electrode 22 and emitter electrode 23 of PNP transistor 24 and conductor leads 30, 31 connected to the secondary of step-down transformer 32 driven by alternating current source 33. Although a PNP transistor is illustrated, the invention is not limited to this particular type of semiconductor amplifying element. For example, with transistors of the NPN type, which have forward emitter-collector current flow in the opposite direction, the circuitry is the same except that it conducts on the opposite half cycle, hence bias and the forward load currents are reversed.

A second series circuit 35 comprises the switch contacts 15, 16 of thermostatic actuator 13 and resistor 36, one end of this series circuit being connected to the base electrode 37 of transistor 24 and the other connected to the node 38 of the first series circuit 20.

The operation of the circuit of FIG. 1 is as follows: Transistor 24 is connected in what is commonly referred to as the common emitter mode. With the thermostatic actuator 13 open as shown, no base current flows in the base of transistor 24 so that the transistor appears as a high impedance between the conductor leads 30, 31 and the relay load 11. At such time as the temperature of the room reaches the preset value which closes contacts 15, 16, those half cycles of alternating current which drive conductor lead 30 positive with respect to conductor lead 31 forwardly bias the emitter-base junction of transistor 24 to cause base current to flow to the base 37. The transistor is then biased to its conductive state wherein current flows through a low impedance path provided by the emitter-collector of the transistor to the load 11. The base current is preferably adjusted by resistance 36 to cause the transistor 24 to saturate during the forward biasing half-cycles, thus permitting use of a small transistor to handle comparatively large load currents. On opposite half cycles of each A.C. cycle, the emitter-base junction is zero biased substantially resulting in non-conduction of the transistor which provides only a small reverse current through the load 11.

A primary advantage of the system of FIG. 1 is that the thermostatic element 13 carries only the very small base current whereas the load or collector current is equal to the base current times the base-current amplification factor $\beta$. Another advantage is that the circuit may be driven directly from an alternating current source without an intermediate half-wave rectifying element since the transistor element serves the dual functions of amplifying the base current and, because of its electronic nonsymmetry, rectifying the current flow through its emitter-collector electrodes.

Figure 2:
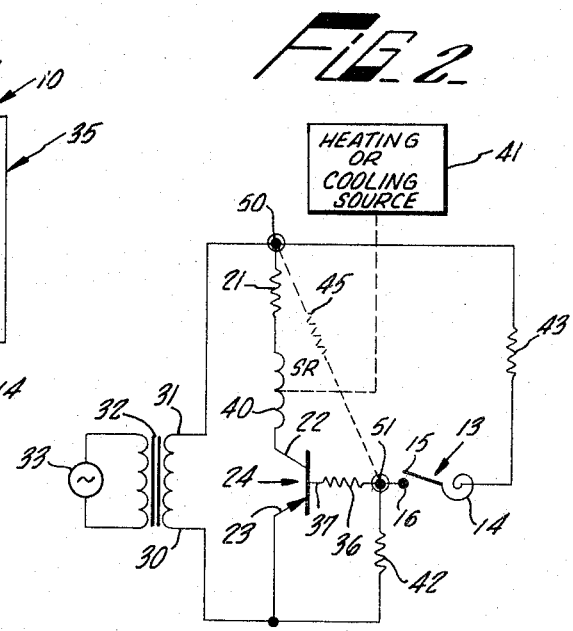
FIG. 2 is a circuit schematic wherein the transistor base is operated from a voltage divider for diminishing sensitivity of the temperature control system to leakage currents across the thermostatically controlled actuator.

A modification of the circuit of FIG. 1 is illustrated in FIG. 2 for installations wherein it is undesirable to operate the transistor 24 in the open base mode. In addition, a typical load is shown in this circuit comprising a relay coil 40 for actuating a heating or cooling source 41. In the embodiment of FIG. 2, the current through the coil 40 is very low for one half of each A.C. cycle. For this reason, the relay coil 12 is shown as a slow release (SR) relay so that hum or contact chatter is obviated during these reverse bias half cycles of A.C. power.

As shown, the base electrode 37 is connected via resistance 36 to the mid-point of a voltage divider comprising fixed resistor 42 and resistance 43 part or all of which may be contact resistance, which are connected together across conductors 30, 31 when the switch contacts 15, 16 are closed. Resistor 42 reduces the sensitivity of the system to leakage currents which by-pass the thermosatically controlled switch 13 when it is open circuit. Such leakage paths may exist across a terminal board, the thermostat leads, and in the thermostat and are represented by dashed resistance 45. For example, the system may incorporate closely spaced terminals 50, 51 on the terminal board of the thermostatic actuated switch 13. The addition, however, of resistor 42 coupled between the emitter 23 and the switch terminal connected to the transistor base 37 increases the current flow through leakage path 45 thus reducing the tendency of the relay to fail to deactuate when the thermostat contacts open.

Resistor 21 serves as a voltage dropping resistor. This resistor may be the internal resistance of the relay coil 40 or advantageously a separate resistance element which serves both as a voltage dropping resistor and also a suppressor for voltage surges induced when the magnetic field of the relay coil collapses during the reverse half-cycle of the alternating current source 33. This surge suppression is particularly important when semiconductive elements such as transistor 24 are employed since such elements have a definite voltage capacity which may easily be exceeded if the transistor rating is equivalent to or only slightly higher than the voltage applied the conductor leads 30, 31.

Figure 3:
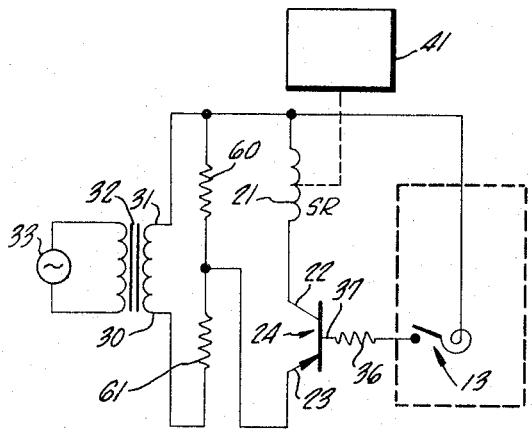
FIGS. 3 and 4 are respective circuit schematics similar to the systems of FIGS. 1 and 2 but modified to utilize low voltage transistors from a standard step-down transformer.
Figure 4:
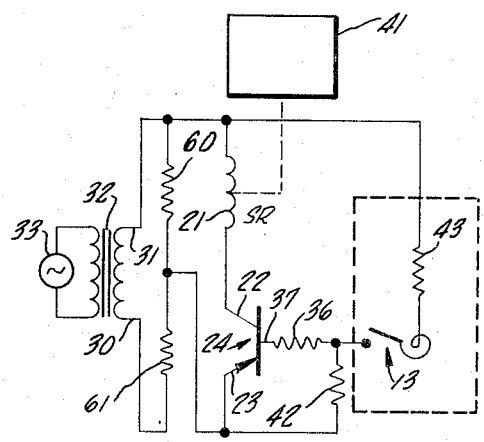

The circuits of FIGS. 3 and 4 incorporate a voltage divider comprising resistors 60, 61 connected to conductor leads 30, 31 of the step-down transformer 32. The emitter 23 of transistor 24 is then connected to the midpoint of these resistors. In a representative embodiment, the output of the step-down transformer is 24 volts, which in turn is divided by two to drive a 12 volt transistor. The resistive character of the voltage divider also tends to reduce the value of the induced voltage transients which result when the magnetic field of the relay coil collapses during the half of each A.C. cycle which reverse biases the transistor.

Figure 5:
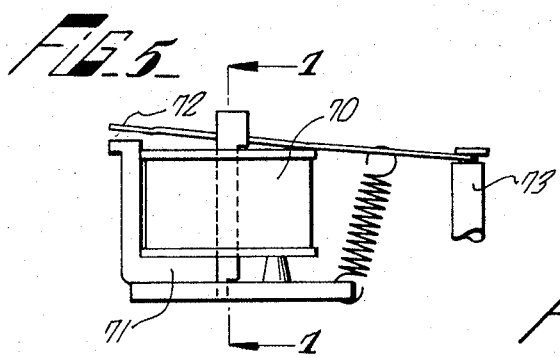
FIG. 5 is a side elevation view of a representative electromagnetic motor operated by temperature control systems of this invention.
Figure 7:
FIG. 7 is a cross-sectional view taken along the line 7—7 of FIG. 5 showing a relay coil including a lag coil.

A representative load element is illustrated in FIG. 5 comprising relay motor having a coil 70 mounted upon a substantially U-shaped magnetic structure 71 and a movable armature or magnetic shunting member 72. At the opposite end of the armature 72 is a driven member 73 which may be used to actuate a gas or liquid fuel valve or like fuel control means. Typically, the relay structure is as shown in FIG. 7 wherein a lag coil comprising an annular copper member 75 is coaxial with the coil 70. The function of this lag coil is as follows: When the magnetic field collapses, a voltage is induced therein which in turn causes a current to flow in the lag coil. This current tends to maintain the magnetic field until the succeeding half of the A.C. cycle. This structure functions as a slow release relay and is preferably utilized in all of the embodiments of the invention described hereinabove to avoid chatter of the relay structure and to reduce the tendency of the relay to hum.

Figure 6:
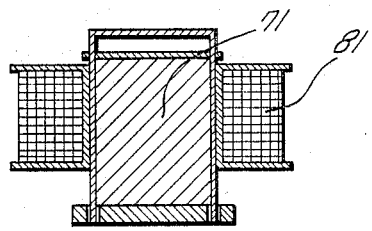
FIG. 6 is a cross-sectional view of a relay coil which does not include a lag coil.

A feature of the preferred embodiment of the present invention is that the relay structure may be constructed as shown in FIG. 6 and comprise a larger coil member 80 having an increased number of turns in the same space because of the deletion of the lag coil. Alternatively, the overall size of the coil may be reduced if only the same magnetic force is required.

Figure 8:
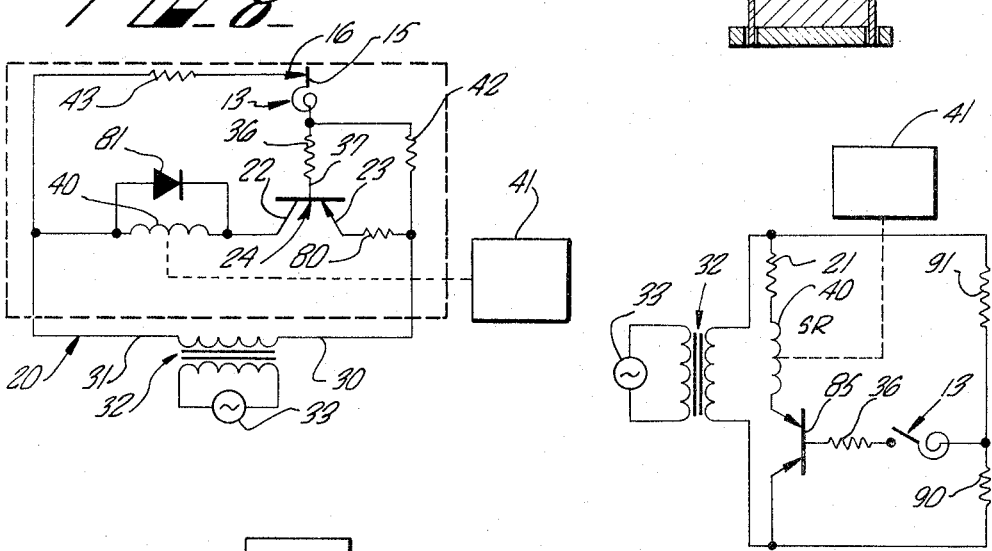
FIG. 8 is a circuit schematic of a preferred embodiment of the present invention.

Referring now to FIG. 8, the preferred embodiment of the invention comprises a first series circuit including the conductor leads 30, 31, relay coil 40, the collector 22 and emitter electrode 23 of transistor 24 and resistor 80. A semiconductor diode 81 is connected in parallel with the relay coil 40 and biased in opposition to the transistor 24. Base current is supplied the transistor via a voltage divider comprisisg the resistors 42, 43 and thermostatic actuated switch 13 with the mid-point node of this divider being connected to the base electrode 37 via resistor 36.

The system of FIG. 8 operates during the forward half cycle to provide a load current from the conductors 30, 31 when the transistor 24 is biased to its current conductive state upon closure of the contacts 15, 16 of the thermostatic actuator 13. Upon opening of these contacts, the transistor base current is interrupted so that only leakage currents are supplied the relay coil 40. Diode 81, being in opposition to the flow of current through transistor 24, appears as a high impedance during the conductive half-cycles of the transistor and does not affect circuit operation during these conductive half-cycles.

During reverse bias half-cycles of A.C. power, however, the diode 81 serves three important functions. This diode substantially suppresses the surge currents resulting from the voltage generated by the collapse of the magnetic field of the relay coil by providing a low impedance circulating path for these currents, thereby avoiding overloading of the transistor 24. The second function of this diode is that these circulating currents themselves generate a magnetic field in the coil 40 so as to delay the drop out of the relay element until the succeeding forward half cycle of alternating current. The relay may thus be constructed without a lag coil as shown in FIG. 6. The third function of the diode is to by-pass the small reverse currents which flow through the transistor on the reverse bias half-cycle so that this current does not magnetically bias the relay. This further reduces the tendency of the relay to hum.

A further advantage of the system shown in FIG. 8 is that it substantially minimizes the effects of the transistor leakage currents. These currents, particularly when the semiconductor element is mounted in an elevated temperature environment, e.g. in close proximity to the furnace or other heating apparatus, may be sufficiently high to retain the relay in its actuated condition when the thermostatic switch contacts open. In order to correct this deficiency, the resistor 80 is introduced in the emitter path to bias the base electrode 37 toward cut-off in accordance with the emitter-collector circuit. When the thermostat switch elements are closed, the voltage applied to the base is enough to override this reverse bias so that the transistor is biased to a current conductive state. When the thermostat switch contacts open, the reverse bias produced by resistor 80 tends to reduce the transistor leakage so that the transistor will become non-conductive at the elevated ambient temperatures.

The value of resistance 80 is selected such that the voltage drop thereacross when transistor 24 is conductive is not sufficiently high to effect the operation of the relay coil 40.

By way of example only, the following specific components may be employed in the system of FIG. 8:

| | |
|---|---|
| Transformer 24 | 2N398A. |
| Transformer 32 | Stepdown from 115 volts. to 24 volts. |
| Resistor 36 | 2200Ω. |
| Relay coil 40 | 2500 turns of No. 38 wire (400Ω). |
| Resistance 42 | 5600Ω. |
| Resistance 43 (contacts) | Up to 5000Ω. |
| Resistance 80 | 560Ω. |
| Diode 81 | 1N90. |

Figure 9:
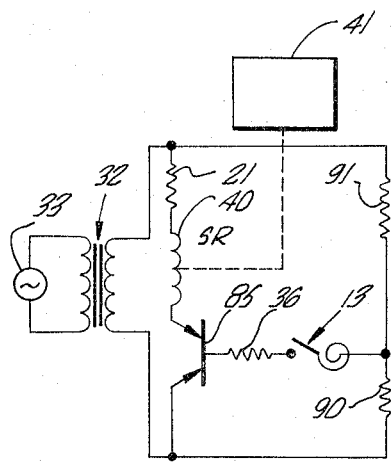
FIGS. 9 and 10 are respective circuit schematics of embodiments of the invention which provide full-wave rectified current to the relay coil of the electromagnetic actuator.
Figure 10:
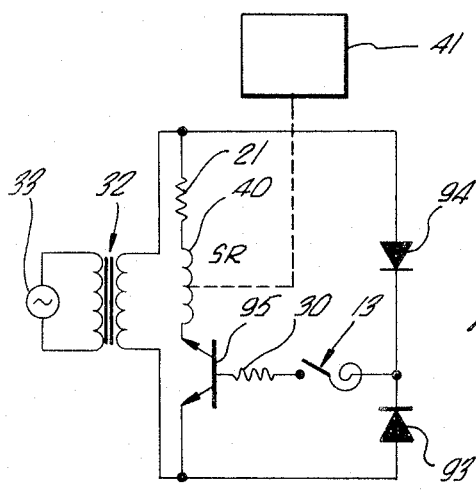

FIGS. 9 and 10 illustrate respective embodiments for supplying alternating current to the load element. Each circuit includes a bidirectional switching transistor, the circuit of FIG. 9 employing PNP transistor 85 in conjunction with voltage divider resistors 90, 91 whose values are selected to achieve a symmetric load waveform. Diodes 93, 94 may be used in place of the resistors and also a bidirectional transistor 95 of the opposite polarity as shown in the circuit of FIG. 10.

The operation of the circuits of FIGS. 9 and 10 is similar to that of the operation of the circuitry described hereinabove except that the transistor element is biased to a current conductor state during each half of the alternating current wave-form when the thermostat switch contacts are closed. Accordingly, load currents are supplied relay coil 40 for each half cycle, thereby providing a symmetric alternating current to the load. The load for these circuits will hence be characterized for A.C. instead of D.C. as described above.

Although exemplary embodiments of the invention have been disclosed and discussed, it will be understood that other applications of the invention are possible and the embodiments and methods disclosed may be subjected to various changes, modifications and substitutions without necessarily departing from the spirit of the invention.

We claim:
1. A temperature control system for controlling the flow of current through a relay coil including, in combination, a semiconductor amplifying device having a current-emissive electrode, a current-receiving electrode, and a control electrode for current passing between said current-emissive and current receiving electrodes;

means for providing a flow of current through said relay coil when current flows at the control electrode of said amplifier device, said means connecting (i) said relay coil in series circuit with the current-emissive and the current-receiving electrodes of said amplifying device, and (ii) said series circuit to a source of alternating current power;

a temperature sensitive bimetallic switch;

means for providing a flow of current at the control electrode of said amplifying device when said bimetallic switch is closed so that the semiconductor amplifying device is biased to a current conductive state on one-half of each A.C. cycle, said means comprising a resistor connected in series circuit with said bimetallic switch, said series circuit being connected between said control electrode and one terminal of said source of alternating current; and means in circuit with the current-emissive electrode of said amplifying device for compensating for the effect of current leakage in the semiconductor device so that there is insufficient current flow through said relay coil to maintain said relay in its actuated condition when said bimetallic switch is open, said means applying a reverse bias to said control electrode for reducing said leakage current.

2. The temperature control system defined in claim 1 wherein said means for compensating for the effect of current leakage comprises a resistor in series with the current-emissive electrode of said semiconductor amplifying device, said leakage current through said resistor applying said reverse bias to the control electrode of said amplifying device.

3. The temperature control system defined in claim 1 comprising a diode connected in parallel with said relay coil and biased in opposition to said amplifying device for (i) substantially suppressing surge currents resulting from the voltage generated by the periodic collapse of the magnetic field of said relay coil when said amplifying device is on, (ii) providing a current flow through said coil during at least a portion of the reverse bias A.C. half-cycle to delay the drop-out of the relay and (iii) bypassing reverse currents on reverse bias half-cycles of each A.C. cycle.

4. The temperature control system defined in claim 1 comprising means for reducing the sensitivity of said system to leakage currents which bypass the bimetallic switch when it is open, said means comprising a second resistor connected between the other terminal of said source of alternating current and the common junction of said bimetallic switch and the resistor connected to the control electrode of said amplifying device.

5. A temperature control system for actuating a non-slow release relay coil, e.g. one lacking a lag coil, with half-wave rectified power which system avoids the relay hum ordinarily provided by such power, said system comprising a transistor having emitter, collector and base electrodes;

conductor leads adapted to be connected to an alternating current power source;

a first resistor;

a first series circuit comprising said first resistor, the emitter and collector electrodes of said transistor, and said relay coil, said first series circuit being connected to said conductor leads;

a diode connected in parallel with said relay coil and biased in the direction opposite the forward current flow through said emitter and collector electrodes, a temperature sensitive bimetallic switch;

second and third resistors;

a second series circuit comprising said second resistor, said bimetallic switch, and said third resistor, said second series circuit being connected to said conductor leads in parallel with said first series circuit; and a fourth resistor connected between the common terminal of said second resistor and said bimetallic switch and the base electrode of said transistor so that said transistor is biased to a current conductive state on one-half of each A.C. cycle when said bimetallic switch is closed and remains nonconductive during each conductive cycle when said switch is open, said first resistor developing a reverse bias for reducing the flow of leakage current through said transistor when said bimetallic switch is open and said second resistor providing a path for leakage currents which bypass the bimetallic switch when it is open for reducing the sensitivity of said system to said current leakage paths.

References Cited by the Examiner

UNITED STATES PATENTS

| | | | |
|---|---|---|---|
| 3,210,749 | 10/1965 | Magor | 340—248 |
| 3,247,323 | 4/1966 | Carroll | 307—88.5 X |

FOREIGN PATENTS

| | | |
|---|---|---|
| 1,155,336 | 10/1957 | France. |
| 1,261,997 | 4/1961 | France. |
| 766,867 | 1/1957 | Great Britain. |

OTHER REFERENCES

"Electronics," Sept. 13, 1963, issue, page 14.

MILTON O. HIRSHFIELD, *Primary Examiner.*

J. A. SILVERMAN, *Assistant Examiner.*